United States Patent [19]
Non

[11] 3,940,164
[45] Feb. 24, 1976

[54] PASSIVE RESTRAINT SAFETY BELT SYSTEM

[76] Inventor: Tse Quong Non, 2315 S. Wentworth Ave., Chicago, Ill. 60616

[22] Filed: Oct. 16, 1974

[21] Appl. No.: 515,304

[52] U.S. Cl.......... 280/150 SB; 180/82 C; 297/216; 297/390
[51] Int. Cl.²...................................... B60R 21/02
[58] Field of Search.................. 280/150 SB, 150 B; 180/82 C; 297/385, 388, 390, 216

[56] References Cited
UNITED STATES PATENTS

| | | |
|---|---|---|
| 2,873,122 | 2/1959 | Péras ................................ 297/385 |
| 3,022,089 | 2/1962 | Botar............................ 280/150 SB |
| 3,545,789 | 12/1970 | Graham.......................... 280/150 B |
| 3,700,281 | 10/1972 | Servadio................... 280/150 SB X |
| 3,822,896 | 7/1974 | Hallberg.................... 280/150 SB X |

Primary Examiner—Leo Friaglia
Assistant Examiner—Michael J. Forman
Attorney, Agent, or Firm—Fitch, Even, Tabin & Luedeka

[57] ABSTRACT

A passive restraint safety belt system for a vehicle comprises at least one belt movable from a hidden stowed position to a restraining position about the occupant of the vehicle at the time of an accident. Means are provided for sensing an impact or sudden deceleration or acceleration of the vehicle and are operable to shift the belt from the stowage position to the restraining position. Means are also provided for returning automatically the belt from the restraining position to the stowage position so that the belt may be readily reused. Preferably, the safety belt is substantially hidden from view and does not interfere with ingress or egress from the vehicle.

11 Claims, 5 Drawing Figures

PASSIVE RESTRAINT SAFETY BELT SYSTEM

This invention relates to a safety belt system for motor vehicles and more particularly to a passive restraint safety belt system in which the belt is moved automatically to a restraining position at the time of sudden deceleration or acceleration of the vehicle.

The present invention is directed to a passive restraint system which operates automatically without any conscious operation thereof by the vehicle driver or any of the occupants of the vehicle. One type of passive restraint system is the air bag system which upon a sudden acceleration or deceleration of the vehicle or an impact causes an air bag to be expanded to restrain the driver. However, the air bag may momentarily blind the vision of the driver which, in high speed traffic, is dangerous and may be the source of further accidents. Also, the air bags are expensive and are used in connection with belts as the air bags do not restrain against lateral impacts. After an expansion of the air bag, the air bag system is inoperative until the system has been rejuvenated by trained service personnel. This is in contrast to a safety belt which remains in position after an accident and which provides protection against a following accident without the expense of being reinstalled by trained personnel.

The conventional seat belt arrangement installed at this time is an active system rather than a passive system requiring the passenger to connect the seat belt to extinguish an alarm buzzer or to defeat an interlock system which prevents operation of the vehicle until the seat belt is connected. The interlock systems, which require fastening of the seat belt, are expensive and capable of being defeated.

Another passive restraint system proposed but not adopted on a large commercial scale includes a series of belts which are exposed and which, after the opening and closing of a vehicle door, move into restraining positions about the driver and/or passenger. However, the manifold exposed belts of this passive restraint system are unsightly and displeasing. Also, this system is complex in that mechanisms must shift the belts to allow ingress and egress of the vehicle.

U.S. Pat. No. 3,022,089 discloses a passive safety belt system in which the safety belt is stowed in a remote or obscure stowage position until the time it is needed, whereupon the belt is shifted to the restraining position to restrain the passenger from injury. However, the system shown in this patent only has a lap belt and is quite crude in its components. However, the safety belt may be returned to the stowage position and ready for reuse in case of a subsequent accident without the cost and expense of having to be rejuvenated by trained personnel.

Accordingly, a general object of the present invention is to provide a new and improved, as contrasted with the prior art, passive safety belt restraint system.

Other objects and advantages of the invention will become apparent from the following detailed description taken in connection with the accompanying drawings in which.

Figure 2:
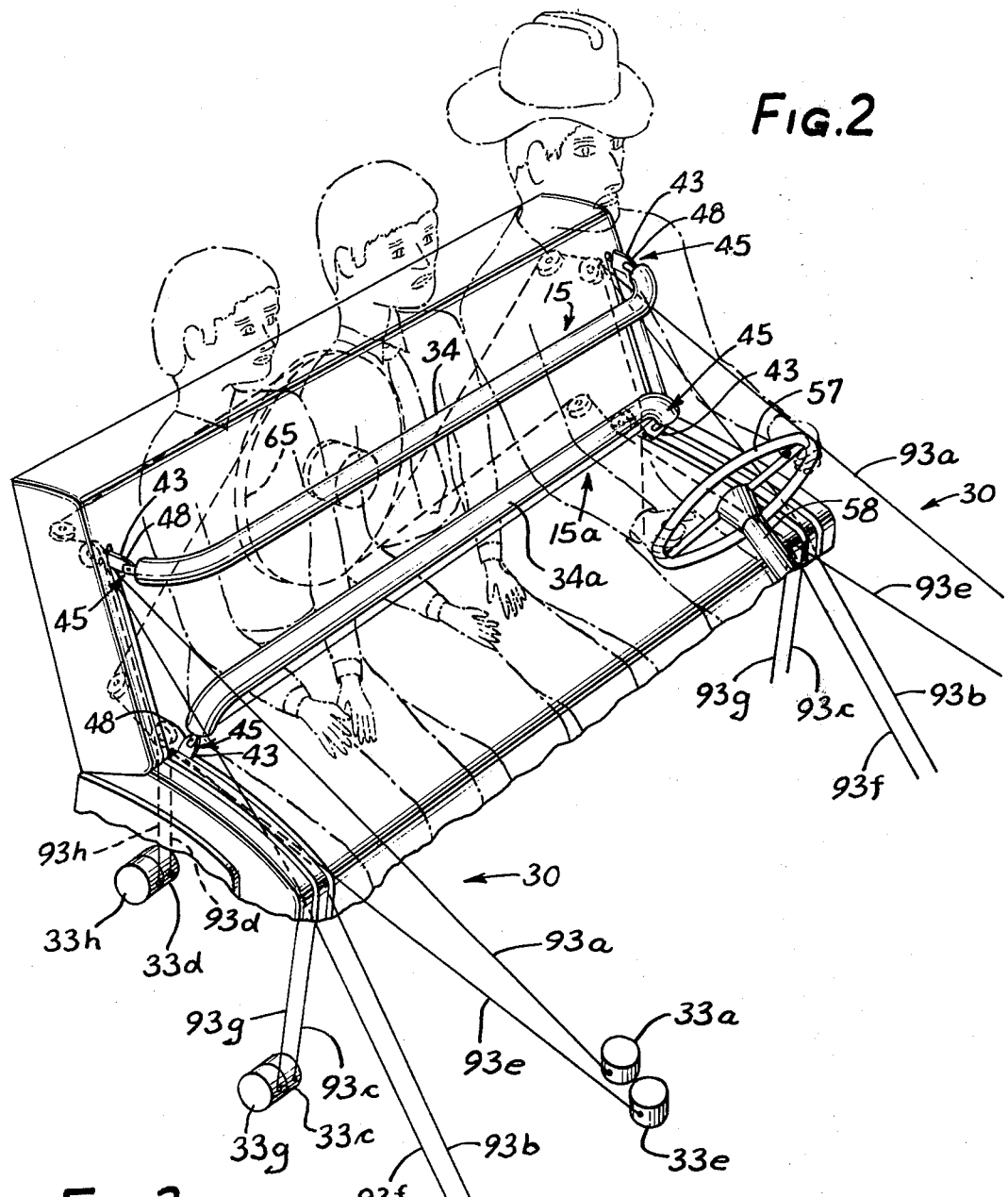
FIG. 2 is another view of the safety belt system of FIG. 1 with the safety belts in their restraining positions about the vehicle passengers.

As shown in the drawings for the purposes of illustration, the invention is embodied in a passive restraint system 11 for use in a vehicle 12 such as an automobile having a seat 13 upon which are seated one or more occupants. The restraint system 11 includes one or more seat belts 15 which are in a stowed position 16 allowing free ingress or egress from the vehicle. The preferred stowage position for the seat belt is in a relatively obscure or hidden position from which the belt is moved to the restraint position, such as shown in FIG. 2, at the time of an impending accident or a sudden deceleration or acceleration which normally is indicative of an impending collision.

Figure 3:
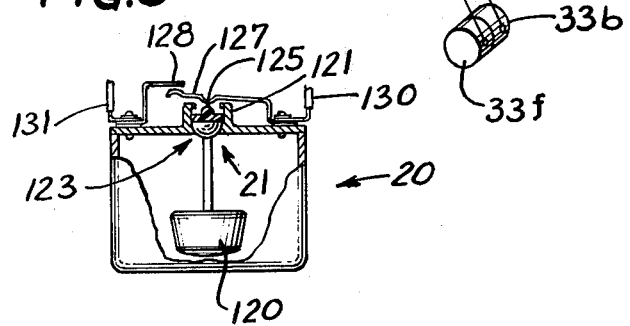
FIG. 3 is a diagrammatic view of a switch mechanism for operating the system of FIG. 1.

In accordance with the present invention, the occurrence of a sudden acceleration or deceleration causes an electrical control means 20 (FIG. 3) including an inertia switch means 21 to operate a means 23 to shift the safety belt 15 from the stowage position 16 to the restraining position at the chests of the occupants holding them against unrestrained forward movement. In contrast to the air bag type of a restraint system, the safety belt 15 may be readily returned by a return means 27 from the restraint position to the stowage position 16. Herein, the preferred return means 27 is in the form of a retracting means 29 which retracts the seat belt 15 to the stowed position.

In accordance with another important aspect of the invention, substantially the entire safety belt 15 which includes a pair of cable-like end portions, hereinafter called cables 30, is stowed in an inconspicuous manner with the cables 30 being stowed in stowage recesses 32 in the floor or floor carpet of the vehicle and in recesses formed in the seat 13. As will be explained in greater detail, the cables 30 are held and biased into the recesses 32 by the retracting means 29 which includes a series of individual retractors 33 spring biased to return the cables 31 into the recesses 32 in the seat upon de-activation of the shifting means 23.

Turning now in greater detail to the individual elements of the restraint system 11, the preferred seat belt 15 comprises a soft or inflatable, central occupant engaging portion 34 having a generally circular cross section. The seat belt portion 34 preferably extends transversely across the front of the seated occupant. The illustrated seat belt portion 34 is also mounted to turn about a longitudinal axis through it so that it may roll along the occupant's clothing or body when it is contacting the body and moving toward the restraint position at the occupant's waist or chest. Likewise, should the belt portion 34 hit the steering wheel 57, it will continue to roll therealong. In the preferred embodiment of the invention, a pair of seat belts 15 and 15a of identical construction are used with the seat belt portion 34 positionable at the chest of the occupant and the seat belt portion 34a positionable at the waist of the occupant as shown in FIG. 2. Alternatively, one seat belt may be used as will be explained hereinafter in connection with FIG. 4.

The preferred manner of providing rotation for the seat belt portion 34 or 34a is to provide a rotational bearing 41 at each end of the seat belt mounted for turning relative to a non-rotatable connector plate 43 which is suitably connected by releasable connector 45 to an end of one of the cables 31 or 31a, the cable 31a being attached to the seat belt 15a. The preferred releasable connectors 45 are in the form of a releasable connector or snap ring 48 connected to a cable end and adapted to be disconnected from a circular aperture in the connector plate 43 so that an occupant may also detach the seat belt portion 34 and 34a if he is desirous of quickly releasing himself for egress of the vehicle after an accident.

The preferred means 51 for stowing the seat belt portions 34 and 34a is adjacent the bottom of the dashboard and may include a suitable slot in the lower portion of the dashboard or a suitable mounting bracket means 53 for holding the seat belt portions in a generally hidden position at a lower end of the dashboard. In this manner, the seat belt portions 34 and 34a will be spaced upwardly of the feet of the occupant and above any foot pedals or other devices and yet beneath the steering wheel 57 and the steering column 58 for unobstructed movement when the shifting means 23 is actuated to bring the seat belts to the restraint position. Of course, other stowage positions for the seat belt may be used and fall within the purview of the present invention.

The shifting means 23 for shifting the seat belts 15 and 15a from the stowage position 16 to the restraint position preferably comprises a power or motor means 59 in the form of an electrical motor and a reel means 63 of conventional design. Preferably, the power or motor means also comprises a one-way clutch or brake means 61 to prevent the passenger's body from exerting sufficient force to unwind the cables 31 or 31a. Herein, the output shaft of the electrical motor means 59 is connected through a brake 62 to the reel means 63 in the form of a rotatable disc 65 mounted within or adjacent the seat back 66. Ends of each of the respective cables 31 and 31a on opposite sides of the seat 13 are connected by means 67 to the reel means to wrap about the reel disc 65 when the motor means 59 is energized with closing of the inertia switch means 21. Preferably, the cables 31 and 31a are connected at tangent lines to the reel disc 65 and are wrapped about the reel disc to an equal extent when pulling the cables 31 and 31a. The brake or one-way clutch means 61 is actuated when the motor 59 is actuated to prevent the return directional movement of the reel as would allow the occupant's weight to pull the seat belts 15 and 15a forward. That is, a one-way mechanical brake means 61 may be provided to provide any unwinding of the cables 31 or 31a due to the force of the occupant's body tending to pull the cables outwardly to unwrap them from the reel.

A suitable return or release switch means 69 may be provided on the dash or on the floorboard for actuation to release the brake means 61 after the accident. Alternatively, the return or release switch means 69 may be replaced by a time delay means which allows the one-way brake or clutch means 61 to be de-activated a short period of time after the seat belt has been moved into the restraint system. In either event, the brake or one-way clutch means 61 is disabled a short period of time after the accident to allow the occupant to escape from the vehicle if he so desires. If the brake or one-way clutch means 61 fails to release for some reason, the occupant may unsnap the releasable connector 45 and still escape from the vehicle.

While the illustrated power motor means 59 is an electric motor, other pneumatic or hydraulic motors may be used as the power motor means 59 to shift the safety belt 15. Also, the shifting means 23 may include other forms of take-up devices than the illustrated reel means 63. The preferred power motor means 59 operates almost instantaneously upon closing of the switch means 20 as in the manner of the air bag which operates sufficiently fast to prevent injury to the passenger.

The illustrated cables 31 and 31a are bands or cables formed of steel, nylon or other strong materials and are separably connected to the round, soft seat belt 15 or 15a and thereby provides a relatively small diameter cable, which may be multistranded to provide the desirable flexibility and strength for being stowed, and movable to the taut, straight line position shown in FIG. 2. On the other hand, the seat belt 15 or 15a may be a one-piece integral belt of the conventional seat belt webbing. The preferred steel cables 31 and 31a are more easily and readily directed through the back of the seat and wrapped onto the reel means 63.

Figure 1:
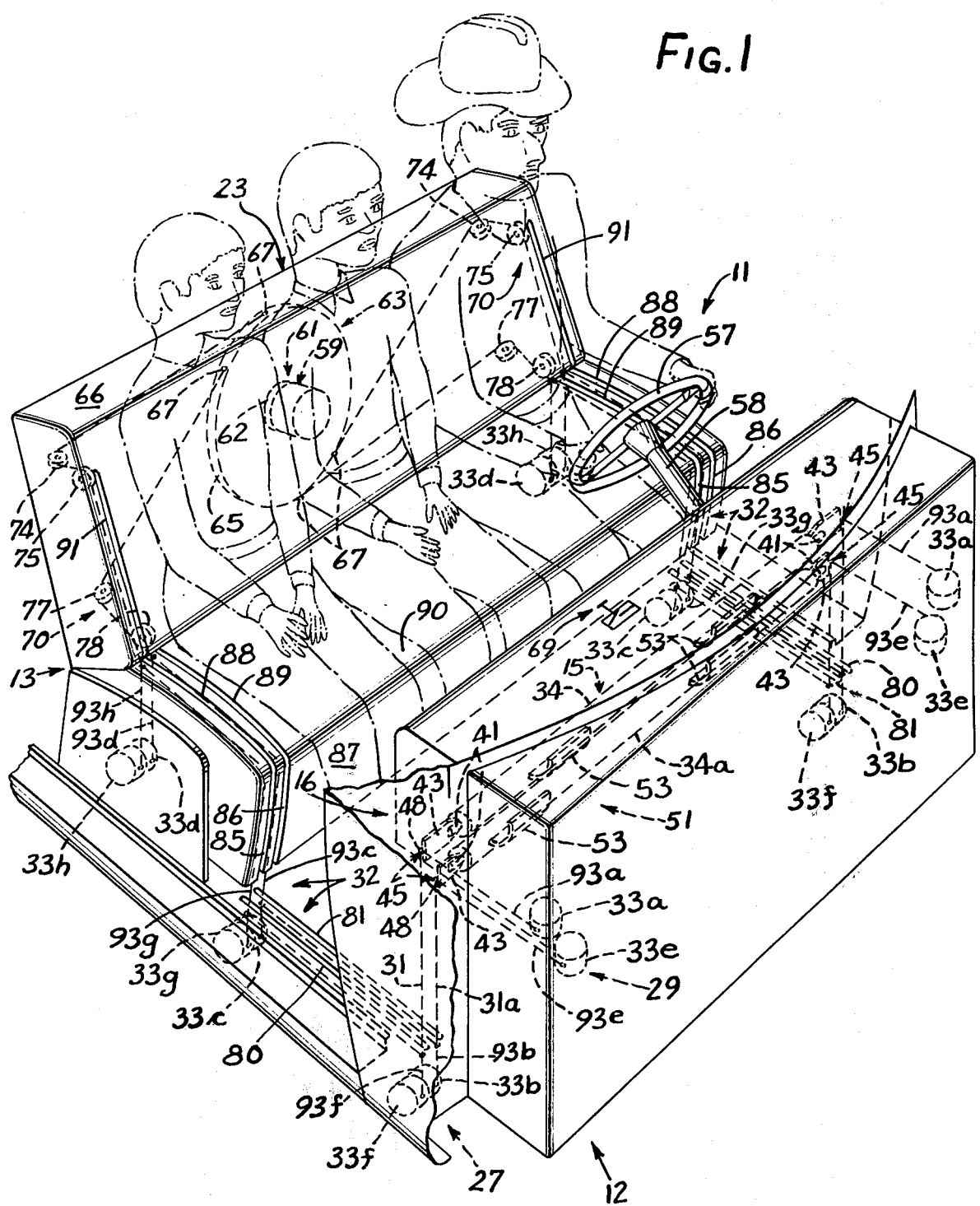
FIG. 1 is a diagrammatic view of a safety belt system mounted in a vehicle and embodying the novel features of the invention.

The cables 31 and 31a are guided by a cable guide means 70 shown in FIG. 1 which includes several pulleys 74 and 75 mounted within the seat back 66 for guiding the cable 31 about a predetermined path to the reel means 63. The cables 31a may likewise be guided by one or more pulleys 77 and 78 mounted within the seat back 66 to the reel means 63.

To mount the cable 31 and 31a in the stowage positions, the recesses 32 in the vehicle floor may be in the form of a pair of forward and aft extending slots 80 and 81 of sufficient depth that the cable may be inserted therein and remain hidden and not interfere with the passenger's movement into or from the vehicle. For similar purposes, the recesses 32 comprise pairs of vertical slots 85 and 86 extending along the front edge 87 of the seat 13 and in alignment with the rearward ends of the floor slots 80 and 81. The slots 85 and 86 in the front edge of the seat extend into similar and aligned slots 88 and 89 in seat bench 90 of the seat 13. When the chest belt is used, another recess 91 is provided in the seat back 66 for the cable 31.

In the illustrated embodiment of the invention, the return means 27 for the seat belts 15 and 15a includes a series of retracting means 29 comprising four retractors 33a, 33b, 33c and 33d connected to each cable 31. In a similar manner, the retracting means 29 for each cable 31a comprises four retractors 33e, 33f, 33g and 33h, disposed adjacent the retractors for the cables 31. The illustrated retractors 33 include a conventional spring biased reel upon which is coiled a strand 93 which has an inner end connected to the reel within its associated retractor and outer end fastened to the portion of the cable 31 or 31a most closely adjacent to its retractor when the cables are in the recesses 32. The strands 93a and 93e for the retractors 33a and 33e are very long and, as seen in FIG. 2, extend from their respective retractors to points at the top and bottom of the slot 91 in the seat back 66.

With belt in restraining position of FIG. 2, each of the three strands 93a, 93b and 93c fastened to a cable 31, extends to the top of the slot 91 to the pulleys 74 and 75. The strands 93d will be generally vertical within the slots 91. Similarly, the strands 93e, 93f and 93c will be extended from their respective retractors to the bottom of the slots 91. Because of the considerable unwinding of the respective strands 93 and because of the bias springs in the retractors 33, these retractors will automatically return the cables 31 and 31a into their stowage recesses 32 and return the seat belt portions 34 and 34a into the stowage position 16.

The preferred positions for the retractors 33a and 33e are beneath the dashboard 51 and in a generally horizontal plane above the top of the bench seat 90 to return the seat belts into or adjacent the stowage means 53 therefor in the dashboard. Disposed in a vertical plane beneath the forward ends of the slots 80 and 81 are the retractors 33b and 33f which hold the cables in vertical, taut positions out of position of engagement of the feet of the persons in the vehicle. The cables 31 and 31a extend horizontally in the slots 80 and 81 to a position at the rear ends of these slots at which are located the retractors 33c and 33g, the latter also being located at positions generally below the front end 87 of the seat. The seat 13 may be shifted backward or forward in the conventional manner with the retractors 33 unwinding or taking up the strands 93 and the cables 31 and 31a are taken up further into the recesses and into the retractors or are allowed to move from the retractors to accommodate such seat movements. Thus, the cables 31 and 31a will remain within the floor recess slots 80 and 81 with seat movement. The retractors 33c and 33g also assure that the cables 31 and 31a remain within the recessed slots 85 and 86 in the front end 87 of the seat and also cooperate with the rearward retractors 33d and 33h to hold the cables in the horizontal recess slots 88 and 89 in the horizontal portion of the seat. The retractors 33d and 33h are located beneath the bench back 66. The retractors 33d also assure that the cables 31 will remain within the vehicle bench slots 91.

Figure 4:
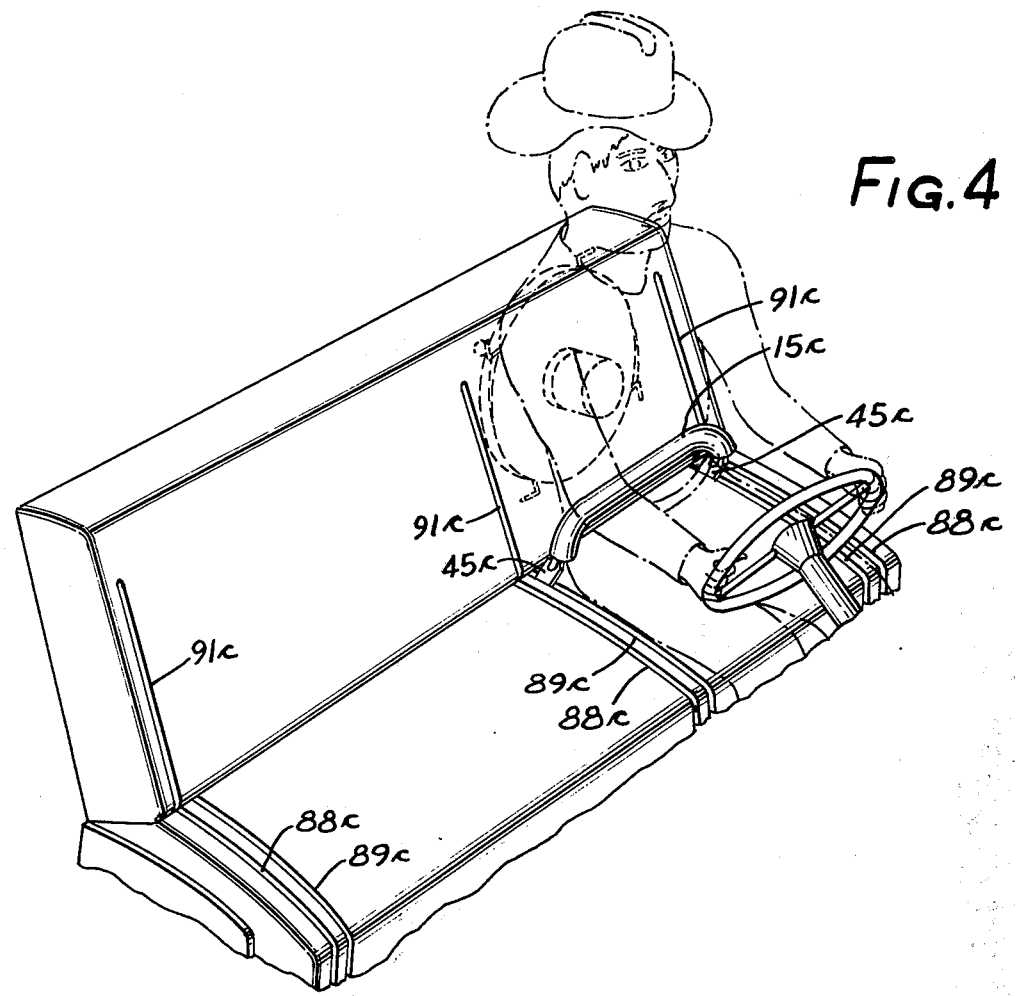
FIG. 4 illustrates a further embodiment of the invention.

In accordance with a further embodiment of the invention illustrated in FIG. 4, a short safety belt 15c may be disposed about the driver only with a second safety belt (not shown) provided for the other front seat occupants. Suitable recess slots 88c, 89c and 91c are provided for the cables used for the wider seat belt for the other passenger, or passengers, of the seat as shown in the embodiment of the invention illustrated in FIG. 4.

Figure 5:
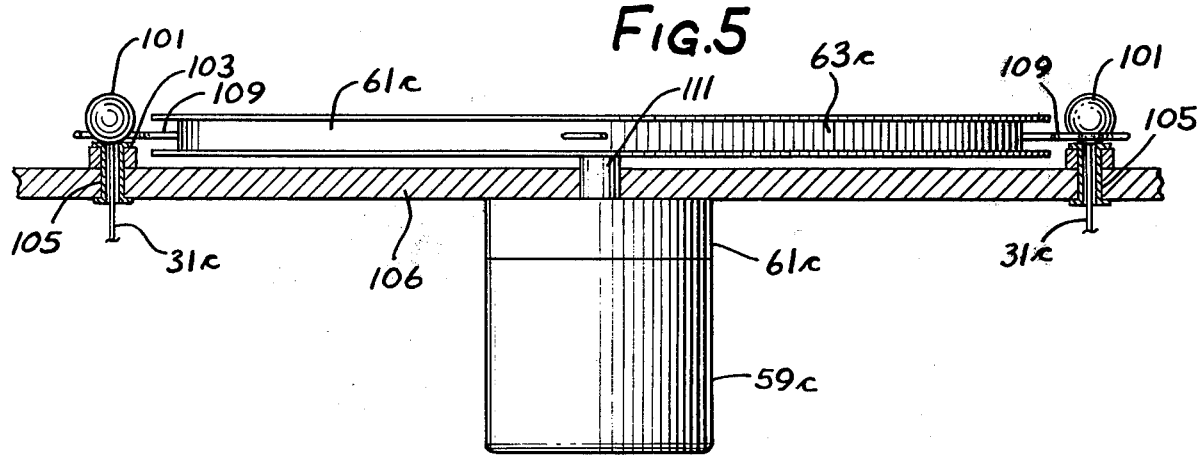
FIG. 5 is an enlarged view of a motor and reel means for positioning the safety belt shown in FIG. 4.

The cables 31c shown in FIG. 5 are connected to the belt connectors plates 45c in the manner above described. However, rather than attaching the ends of the cables 31c directly to a reel means 63c, it is preferred to terminate the cables 31c at a connecting ball 101 disposed to abut an end 103 of a guide bushing 105 carried in a stationary mounting plate 106 mounted within the seat back 66. Curved hooks or fingers 109 are fastened to the rotatable disc 63c and are turned thereby to catch the cables 31c intermediate the bushings 105 and the balls 101 and to pull the cables 31c through the bushings 105. The balls 101 are larger than opening in the hooks so that the hooks abut the balls 101 and continue to pull the cables 31c to shift the seat belt 15c from a stowage position not shown, but similar to the stowage position 16 above described, as the reel disc 63c turns. More specifically, hooks 109 are open on one side so that they will grab the cables 31c and balls 101, when the disc 63c turns in a first or clockwise direction as viewed in these figures upon operation of a power motor means 59c having a driving shaft 111 connected to the disk 63c. A suitable one-way clutch or brake means 61c may likewise be provided to prevent the momentum of the occupant's body from overcoming the winding torque and preventing the undesirable retrograde movement of the seat belt 15c until the accident has terminated. However, once the one-way clutch or brake means 61c is deactuated as either by a time delay switch means or by a manually actuated switch means 69 as above described, the power motor means 59c allows or turns the disc 63c in the reverse direction thereby allowing the cables 31c to be returned by the respective retracting means (not shown) including retractors similar to those shown in FIG. 1 but not illustrated in FIG. 4. After suitable returning of the cables 31c, the hooks 109 disengage from the balls 101 and the cables 31c. When the power motor means is again actuated, the reel disc 63c will again be connected or clutch by the balls 101 and hooks 109 to the cables 31c.

When only a waist seat belt 15c is used, the reel disc 63c has only two hooks 109, the cables 31c being led by and guided across suitable pulleys (not shown) to the positions in the guide bushings 105 in the mounting plate 106. If a breast safety belt is also used with the apparatus shown in FIGS. 4 and 5, a second pair of hooks 109 (not shown) each spaced at 90° from the illustrated hooks 109 are added to pull the similarly guided cables 31c so that both of the chest and waist seat belts may be pulled by the same power motor means 59c simultaneously to the restraint positions from the stowage positions.

The electrical switch means 20 is preferably an inertia switch means 21, but may be an actual impact switch mounted in a front bumper. The illustrated inertia switch means 21 has a pendulum member 120 mounted on a hemispherical pivot member 121 and in an omnidirectional support 123, which allows pivoting of the pendulum member and causes its actuator 125 to move a normally open switch contact 127 against the other switch contact 128 to close the switch and complete an electrical circuit through leads 130 and 131 to the power motor means 59.

Preferably, the power motor means 59 is very quick acting an rapidly reels the cables 31 and 31a causing a quick motion on the seat belt portions 34 and 34a from the stowage positions to their restraining positions. The particular position of the hands and arms of the occupants of a front seat may vary. In some instances, the occupants, upon seeing an imminent crash or deceleration, will thrust their hands forwardly toward the dashboard and the seat belt portions will slide under their arms and against their waists and breasts. On the other hand, when the occupants are not aware of the accident, the arms may be down and the belt portions may move across the outer sides of their arms, pinning their arms momentarily. It is assumed that the driver occupant will have at least one hand on the steering wheel so that he will have at least one hand free for continued steering of the vehicle as the belts move instantaneously from the stowage position 16 to the restraint position. In contrast to an air bag, a driver will have his vision unimpaired by the seat belts 15, 15a or 15c when the latter are at their respective restraining position. Also, unlike the air bag, the seat belts 15 and 15a may be readily returned to the stowage position for further use and without the cost of rejuvenation or replacement of the air bag.

It will be seen that the foregoing invention provides a passive restraint system which is unencumbered by unsightly belts or other devices and which overcomes many of the shortcomings of the air bag. The preferred system is also capable of being installed or produced at a competitive cost to the other passive restraint systems or to the air bag or to the interlock system.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A safety belt system for a vehicle comprising at least one belt movable from a stowage position to a restraint position at a vehicle occupant's chest to restrain the occupant's upper body, means to shift said belt from the stowage position to the restraining position, means on said belt allowing the same to turn and to move upwardly along the occupant's body toward the occupant's chest, recess means associated with the backrest portion of the vehicle seat for receiving a portion of the belt as the belt comes to the occupant's chest, power operated means for returning said belt from said restraining position after restraining the occupant to the stowage position, an electrical control means operable with a deceleration or acceleration of said vehicle of at least one predetermined magnitude to operate said shifting means to shift said belt automatically from said stowage position to said restraint position, and means to guide said belt to a position about the occupant's chest.

2. A safety belt system in accordance with claim 1 in which said belt comprises a plurality of cables at opposite ends thereof and in which said means to guide said belt comprises guides for said cables.

3. A safety belt system in accordance with claim 1 in which said power operated means to return said belt comprises a plurality of spring actuated retracting means each operably connected to said belt for returning said belt to the stowage position after release of said shifting means.

4. A safety belt system in accordance with claim 1 in which a means retains a portion of said belt in a position extending transversely of the driver's position and in which said belt further comprises cables fastened to transversely spaced portions of said belt and extends rearwardly along the sides of the driver's position for pulling said belt portion against the occupant to hold the occupant in the front seat.

5. A safety belt system in accordance with claim 1 in which a second belt is connected for movement across the waist of an occupant in which said second belt is connected to said shifting means and to said return means for simultaneous movement with said first-mentioned belt.

6. A safety belt system for a vehicle comprising at least one belt movable from a stowage position to a restraint position at a vehicle occupant's chest to restrain the occupant's upper body, means to shift said belt from the stowage position to the restraining position, means on said belt allowing the same to turn and to move upwardly along the occupant's body toward the occupant's chest, recess means associated with the backrest portion of the vehicle seat for receiving a portion of the belt as the belt comes to the occupant's chest, power operated means for returning said belt from said restraining position after restraining the occupant to the stowage position, an electrical control means operable with a deceleration or acceleration of said vehicle of at least one predetermined magnitude to operate said shifting means to shift said belt automatically from said stowage position to said restraint position, and means to guide said belt to a position about the occupant's chest, said means to shift said belt comprising a motor means and a reel means for wrapping said cables thereabout, said motor means and said reel means being located within the backrest of a vehicle seat.

7. A safety belt system in accordance with claim 6 in which said motor means includes a means selectively operable to prevent reverse movement on said reel means and unwinding of the said cables by the occupant's body.

8. A safety belt system in accordance with claim 7 in which release means is provided for operation by the occupant to release said selectively operable means to allow said return means to return said belt to the stowage position.

9. A safety belt system for a vehicle comprising at least one belt movable from a stowage position to a restraint position at a vehicle occupant's chest to restrain the occupant's upper body, means to shift said belt from the stowage position to the restraining position, means on said belt allowing the same to move upwardly along the occupant's body toward the occupant's chest, recess means associated with the backrest portion of the vehicle seat for receiving a portion of the belt as the belt comes to the occupant's chest, power operated means for returning said belt from said restraining position after restraining the occupant to the stowage position, an electrical control means operable with a deceleration or acceleration of said vehicle of at least one predetermined magnitude to operate said shifting means to shift said belt automatically from said stowage position to said restraining position, and means to guide said belt to a position about the occupant's chest, means retaining a portion of said belt in a position extending transversely of the driver's position, said belt further comprising cables fastened to transversely spaced portions of said belt and extending rearwardly along the sides of the driver's position for pulling said belt portion against the occupant to hold the occupant in the front seat, said means to shift said belt further comprising a motor means located behind the seat on which the occupant is seated and further comprising cables extending from said motor means through openings in said seat, said return means pulling said cables into slots in said seat and into generally hidden positions.

10. In combination with a vehicle having a front seat and a dashboard, a safety belt system comprising at least one safety belt stowed in a stowage position in front of the driver of the vehicle, recesses in said seat and its backrest and in said floorboard, said belt having portions thereof extending rearwardly and laterally of the sides of the driver and disposed in said recesses in said floorboard, seat and backrest to be substantially hidden from view, means guiding said belts through recesses in said backrest of said seat at the chest level of an occupant, a power means for taking up said belt portions and removing said seat belt from said stowage position and pulling said seat belt about the chest of the driver on the front seat to restrain the driver against injury at the time of collision, means for sensing an impact or acceleration or deceleration of the vehicle and for operating said power means to shift said belt to the restraining position, power operated means for returning said belt from said restraining position after restraining the occupant to the stowage position.

11. In combination with a vehicle having a front seat and a dashboard, a safety belt system comprising at least one safety belt stowed in a stowage position in front of the driver of the vehicle, recesses in said seat and in said floorboard, said belt having portions thereof extending rearwardly and laterally of the sides of the driver and disposed in said recesses to be substantially hidden from view, means guiding said belts through recesses in said seat at the chest level of an occupant, a power means for taking up said belt portions and removing said seat belt from said stowage position and pulling said seat belt about the chest of the driver on the front seat to restrain the driver against injury at the time of a collision, means for sensing an impact or acceleration or deceleration of the vehicle and for operating said power means to shift said belt to the restraining position, said belt portions being cables, a retracting means retracting said cables to said recesses and returning said belt to said stowage position, said retracting means comprising a first pair of retractors having strands connected to opposite ends of said seat belt for returning said seat belt to the stowage position, a second pair of retractors having strands connected to said cables for returning the forward portions of the cable into the forward end of the recess of the floorboard of the vehicle, a third set of retractors having strands connected to said cables for pulling portions of said cables into rearward portions of said recesses in the floorboard and into recesses in the front edge of the seat, and a fourth set of retractors having strands connected to said cables for pulling the cables into recesses in the upstanding back bench of the seat.

* * * * *